(12) United States Patent
Louden

(10) Patent No.: US 8,636,292 B2
(45) Date of Patent: Jan. 28, 2014

(54) SPRING SUSPENSION ASSEMBLY

(75) Inventor: Bruce Louden, Toowoomba (AU)

(73) Assignee: Big Tyre Pty Ltd, Toowoomba, Queensland (AU)

( * ) Notice: Subject to any disclaimer, the term of this patent is extended or adjusted under 35 U.S.C. 154(b) by 9 days.

(21) Appl. No.: 13/128,664

(22) PCT Filed: Nov. 11, 2009

(86) PCT No.: PCT/AU2009/001468
§ 371 (c)(1),
(2), (4) Date: Jul. 27, 2011

(87) PCT Pub. No.: WO2010/054428
PCT Pub. Date: May 20, 2010

(65) Prior Publication Data
US 2011/0285103 A1    Nov. 24, 2011

(30) Foreign Application Priority Data

Nov. 11, 2008 (AU) ................... 2008905812

(51) Int. Cl.
*B60G 11/113* (2006.01)
*B60G 11/12* (2006.01)
*B60G 17/02* (2006.01)
*B60G 9/04* (2006.01)

(52) U.S. Cl.
USPC ................. 280/124.164; 280/124.1

(58) Field of Classification Search
USPC ................ 280/124.1, 5.515, 124.165, 6.157, 280/124.164; 180/362; 267/228, 242; 152/80, 84, 85, 86, 79, 73, 17, 12, 11, 152/69
See application file for complete search history.

(56) References Cited

U.S. PATENT DOCUMENTS

| | | | |
|---|---|---|---|
| 854,699 A * | 5/1907 | Nash | 152/31 |
| 1,370,845 A * | 3/1921 | Schoenberger | 152/12 |
| 3,162,091 A | 12/1964 | Keller | |
| 3,966,322 A | 6/1976 | Greaves et al. | |
| 4,143,887 A | 3/1979 | Williams et al. | |
| 4,168,075 A | 9/1979 | Matschinsky | |
| 4,348,016 A | 9/1982 | Milly | |
| 4,379,572 A | 4/1983 | Hedenberg | |
| 4,614,359 A | 9/1986 | Lundin et al. | |
| 4,712,780 A | 12/1987 | Ficht et al. | |
| 4,923,209 A | 5/1990 | Armbrust et al. | |
| 5,125,443 A | 6/1992 | Schwartzman | |
| 5,217,248 A | 6/1993 | Reast | |

(Continued)

FOREIGN PATENT DOCUMENTS

| | | |
|---|---|---|
| JP | 49-135947 | 7/1972 |
| JP | 64-020878 | 1/1989 |
| WO | 2006/116807 A1 | 11/2006 |

*Primary Examiner* — Keith Frisby
(74) *Attorney, Agent, or Firm* — Hoffmann & Baron, LLP

(57) ABSTRACT

A spring suspension assembly (50, 50A) for a vehicle which has a plurality of spring elements (77, 83, 77A, 77B, 77C, 83A, 83B, 83C, 787E, 88F, 77G, 77H, 77I, 116, 117, 132, 133, 141, 142) which are attached to an inner carrier (56, 117A) and an outer carrier (86, 120) wherein respective arrays (76, 82, 76A, 76B, 82A, 82B) are oriented in opposing or counteracting orientation and each spring elements (77, 83, 77A, 77B, 77C, 83A, 83B, 83C, 787E, 88F, 77G, 77H, 77I, 116, 117, 132, 133, 141, 142) has a shape corresponding to an arc of a circle characterized in that outer carrier (86, 120) is adapted to be mounted to a vehicle chassis and the inner carrier (56, 117A) is mountable to a vehicle axle shaft.

22 Claims, 17 Drawing Sheets

(56) References Cited

U.S. PATENT DOCUMENTS

| | | |
|---|---|---|
| 5,580,089 A | 12/1996 | Kolka |
| 5,915,705 A | 6/1999 | VanDenberg |
| 6,247,688 B1 | 6/2001 | De Fontenay et al. |
| 7,237,779 B2 | 7/2007 | Kondo et al. |
| 7,237,780 B2 | 7/2007 | Ohki |
| 2003/0230866 A1* | 12/2003 | Lee .................. 280/124.165 |

* cited by examiner

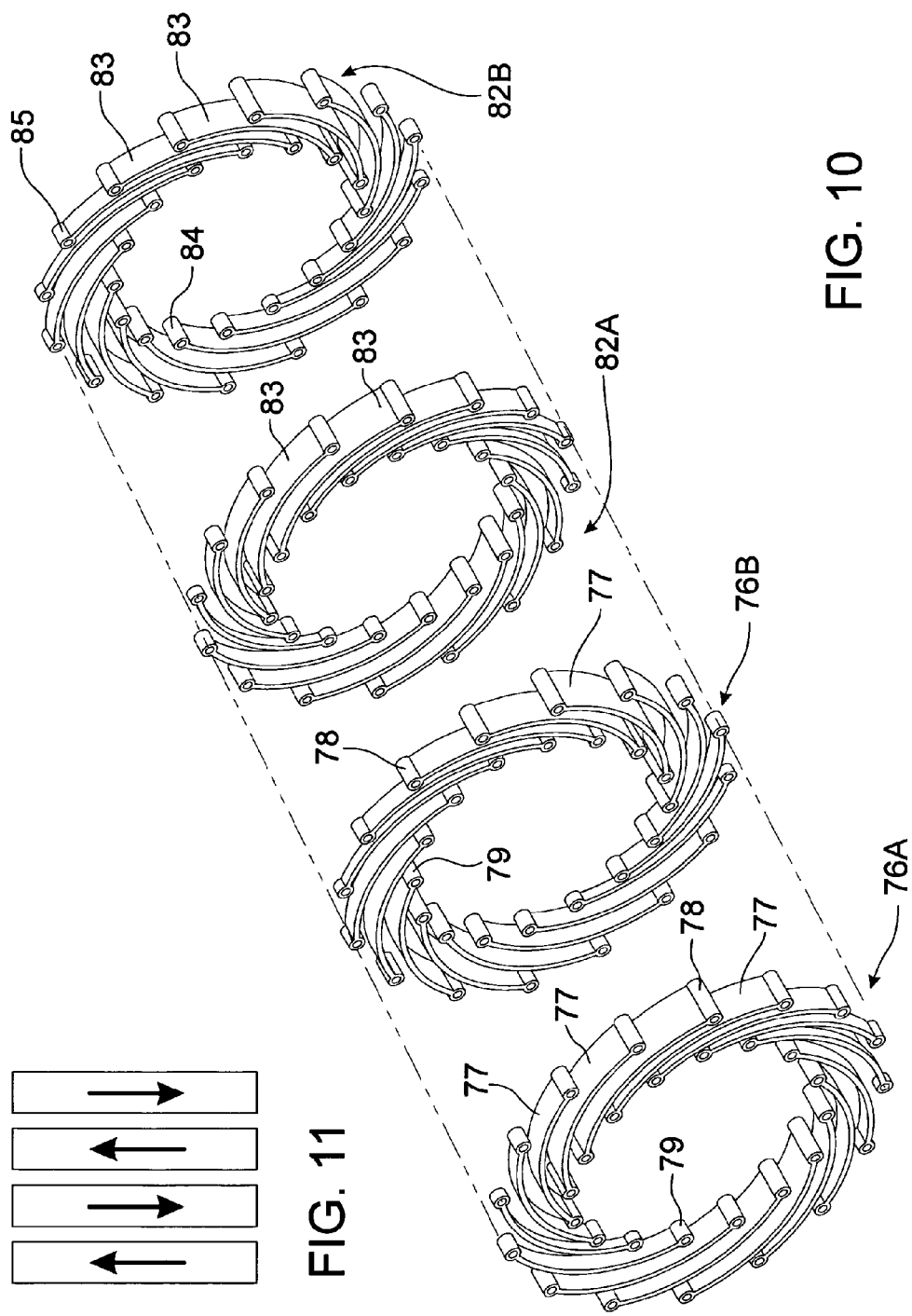

SPRING SUSPENSION ASSEMBLY

This invention relates to an improved spring suspension assembly, which can be used for supporting wheel axles, driving shafts and other elongate members. The invention has specific relevance as a wheel suspension assembly.

Wheel suspension assemblies are well known and basically include opposed leaf spring assemblies which are attached to a wheel axle interconnecting a pair of wheels wherein each leaf spring assembly is also attached to an underside of a vehicle chassis at each end thereof. There also may be provided a pair of hydraulic or pneumatic dampers such as hydraulic or pneumatic cylinders, which are connected to a source of fluid such as hydraulic fluid or air. Upon entry of fluid into each damper the vehicle is provided with a greater load bearing capacity when compared to the situation when fluid is caused to be withdrawn from each damper.

Wheel suspension assemblies also employing leaf spring assemblies are described in U.S. Pat. Nos. 4,614,359 and 5,217,248. In U.S. Pat. No. 4,614,359 there is described a wheel suspension having a transversely extending leaf spring which is adapted to effect adjustment of the vehicle chassis to a desired height or level altitude by manipulation of a spring connector effective to raise and lower the outboard end of the spring connector independently of alteration of the wheel guidance apparatus of the vehicle.

In U.S. Pat. No. 5,217,248 there is described a vehicle suspension assembly having a pair of leaf springs and another leaf spring, oil spring, hydraulic cylinder, pneumatic cylinder or elastomeric suspension member connected to an anti-roll bar or tube. Also provided is a stabilising assembly in the form of an anti-roll bar or tube connected between a pair of leaf spring arms.

Other wheel suspension assemblies using coil springs or helical springs include U.S. Pat. No. 7,237,779 wherein there is provided a suspension coil spring supporting a spring weight of a vehicle, a pivotal unsprung member carrying a road wheel and connected to a lower end of the suspension spring so as to pivot in response to deformation of the suspension spring and a drive mechanism adapted so as to be free from the spring weight and capable of moving the unsprung member so as to cause the suspension spring to increase or decrease in length and thereby adjusting a vehicle height at the road wheel. Other wheel suspension assemblies employing coil springs or helical springs are disclosed in U.S. Pat. No. 7,237,780, which also describes an actuator to axially move one of the coil springs relative to the other. Other wheel suspension assemblies are described in U.S. Pat. Nos. 3,966,322, 4,143,887, 3,162,091, 4,348,016, 4,923,209, 5,580,089, 5,915,705 and 6,247,688.

A wheel suspension assembly using an air spring or a pneumatic cylinder in combination with a carrier arm assembly is described in U.S. Pat. No. 4,379,572. The air spring is adjustable to control its compensability and thus, control the riding characteristics of a vehicle and also alignment of the axle.

U.S. Pat. No. 4,168,075 describes an independent rear wheel suspension assembly having pivotal wheel control members or guide members, which can be adjusted on each side of a vehicle in response to varying vehicle load and/or vehicle speed.

One significant disadvantage of the above-mentioned conventional wheel suspension assemblies is that they are unduly complex in operation requiring the use of hydraulic cylinders, or pneumatic cylinders as suitable dampers or shock absorbing members or alternatively, requiring the use of coil spring assemblies used in conjunction with actuators for controlling the degree of compression of the coil springs. This means that the resulting wheel suspensions did not allow lateral movement because the suspension assembly was attached to a vehicle axle as well as a vehicle chassis and thus transmitted shock from impacts to the vehicle resulting in damage to the vehicle suspension, chassis or other moving part assembly such as a vehicle transmission.

The conventional wheel suspension assemblies are also bulky or cumbersome thus restricting the ability to build articulated machinery that requires tight turning or small turning circles which is needed in underground machinery. Consequently, some underground machinery does not incorporate any vehicle suspension which is a safety hazard and also leads to greater maintenance.

Also, a common method of providing a variable vehicle suspension which includes height adjustment as well as load compensation is by the use of a gas spring or air spring, which is prone to leakage.

It is therefore an object of the invention to provide a spring suspension assembly for a vehicle which is simple in structure and effective in operation.

A spring suspension assembly in accordance with the invention has a plurality of spring elements which are attached to an inner carrier and an outer carrier respectively wherein respective arrays of the spring elements are oriented in opposing or counteracting orientations and each spring element has a shape substantially corresponding to an arc of a circle characterised in that said outer carrier is adapted to be mounted to a vehicle chassis and said inner carrier is mountable to a vehicle axle or shaft.

The inner carrier may comprise a mounting flange attachable or weldable to the vehicle axle or shaft or integral therewith or alternatively, may be an annular member which has a diameter or transverse dimension appropriate for location on the vehicle axle or shaft or a housing surrounding the axle or shaft.

The outer carrier may include an outer housing having an aperture for retention of respective arrays of spring elements or alternatively, may comprise an annular member which is mountable to the outer housing.

The spring suspension assembly in another aspect refers to a suspension system which includes an axle or shaft and a pair of spring suspension assemblies as described above mounted to an adjacent end of the axle or shaft.

It will also be appreciated that the shaft may constitute a propeller shaft or more preferable a vehicle axle. In the case of the propeller shaft, the body may be a support body for the propeller shaft and in the case of a vehicle axle the support body may be the vehicle chassis.

Reference may be made to International Publication WO 2006/116807, which refers to a non-pneumatic tyre assembly which has an outer rim assembly, an inner vehicle hub connection member, a compartment located between the outer rim assembly and the inner vehicle hub connection member and a plurality of spring elements located in the compartment, which are oriented in opposed or counteracting orientations. The entire contents of International Publication WO 2006/116807 are reproduced herein for the sake of reference.

The annular inner carrier as described above may have located adjacent thereto an annular bush or bearing housing in the form of a ball bearing housing or roller bearing housing for example, which facilitates rotation of the plurality of spring elements for load bearing adjustment purposes as described hereinafter. Alternatively, the bush or bearing may be omitted if the plurality of spring elements are designed to be stationary. The inner carrier is preferably a solid annular member having attachment members in the form of apertures, sockets or attachment pins or lugs for use with fasteners interconnecting adjacent inner ends of spring elements to the solid annular member. Such attachment sockets and fasteners may be of the type discussed in FIG. 14 of International Publication WO 2006/116807 for example. The solid annular member may also incorporate a plurality of races on an internal surface thereof for supporting adjoining arrays of spring elements. Such races are useful for preloading the spring elements and providing the means for adjustment of the loading thereafter.

The inner carrier may also be slidably attached to the vehicle axle or shaft and the annular bush or bearing may have an inner circular aperture having an internal surface which receives the axle or shaft. Alternatively as described above, the inner carrier may be welded or rigidly attached to the axle suitably in the case when wheels are attached to stub axles interconnected by the axle.

The spring elements as discussed above may be sufficient width to support the suspension assembly of the invention in a single plane with both arrays of opposing spring elements located in a single plane. However, more preferably each of the arrays of spring elements are located in different planes. Each spring element of each array may be similar in shape but more preferably each spring element may have different widths, thicknesses or be formed of different materials so that when rotation of each array of the spring elements occurs through a number of acute angles up to 90°, the suspension assembly may have a different load bearing capacity after rotation than before rotation. Thus, for example, after rotation a number of spring elements in each array may be altered to have a greater load bearing capacity because they have changed from initially having a substantially horizontal orientation to having a substantially vertical orientation. Such spring elements may be heavier, thicker, of greater width or be composed of a tougher material than other spring elements in each array, which are lighter, thinner of lesser width or be composed of a less tough material so that they have a lesser load bearing capacity. This means that the arrays of spring elements may be rotated so that the lesser load bearing spring elements are oriented more in vertical orientation than the greater load bearing spring elements or vice versa. The amount of rotation may be 30°, 45° or even 90° in some cases.

The outer carrier may also be a continuous annular member of solid or flexible material having appropriate connection means, such as connection sockets, apertures, pins or lugs, on an internal surface for connection to adjacent outer ends of the plurality of spring elements. Preferably use is made of connection sockets, fasteners and retaining lugs as described in FIG. 15 of WO 2006/116807.

The outer housing may also include a bearing housing or bush for rotation of the arrays of spring elements when required. The bearing housing may use ball bearings, roller bearings or other suitable bearings to facilitate rotation of the pair of spring arrays relative to the bush or bearing housing associated with the inner carrier as well as the bush or bearing housing associated with the outer carrier. In this situation of course, the outer carrier and inner carrier will rotate relative to the supporting bushes or bearing housings.

The outer housing may also have part thereof adapted to be attached to a vehicle chassis or vehicle chassis member. Thus, in one form the outer housing may have a flattened surface for abutting a corresponding surface of the chassis or chassis member for attachment thereto by welding or by use of suitable fasteners. In a preferred form, a top part of the outer housing may have a surface aligned in a substantially horizontal plane for this purpose.

The pair of arrays of opposing springs together with their supporting inner and outer solid annular carriers may be movable relative to their respective inner and outer bushes or bearing housings by any suitable means. In one form the outer carrier may have a ring gear or annular gear having a plurality of gear teeth on an internal but more preferably on an external surface thereof. The ring gear may form an inner extension of the outer carrier. Alternatively, the ring gear may be a separate member.

There also may be provided an actuator for initiating movement of the ring gear. In one form this may constitute a worm gear attached to an outer end of a drive shaft of a suitable drive motor. The drive motor may be an electric motor, pneumatic or hydraulic motor which may be actuated remotely of the drive motor such as by using lasers, or a load cell activated automatically when loading or unloading a vehicle. Such automatic operation may also require the assistance of a hydraulic or pneumatic ram assembly.

Alternative means of initiating movement of the arrays of springs may comprise a mechanical lever system connected to a single location on a periphery of the outer annular member, which may be a separate component of the outer rim assembly or be an extension of the solid annular member, or a hydraulic jack which initiates movement of a pair of levers connected to opposed locations of the rotatable plate.

Reference may now be made to a preferred embodiment of the invention as shown in the attached drawings wherein:

FIG. 10 is a perspective view showing two pairs of arrays of opposing spring elements;

FIG. 11 is a schematic diagram showing the orientations of each pair of arrays shown in FIG. 10;

Figure 18:
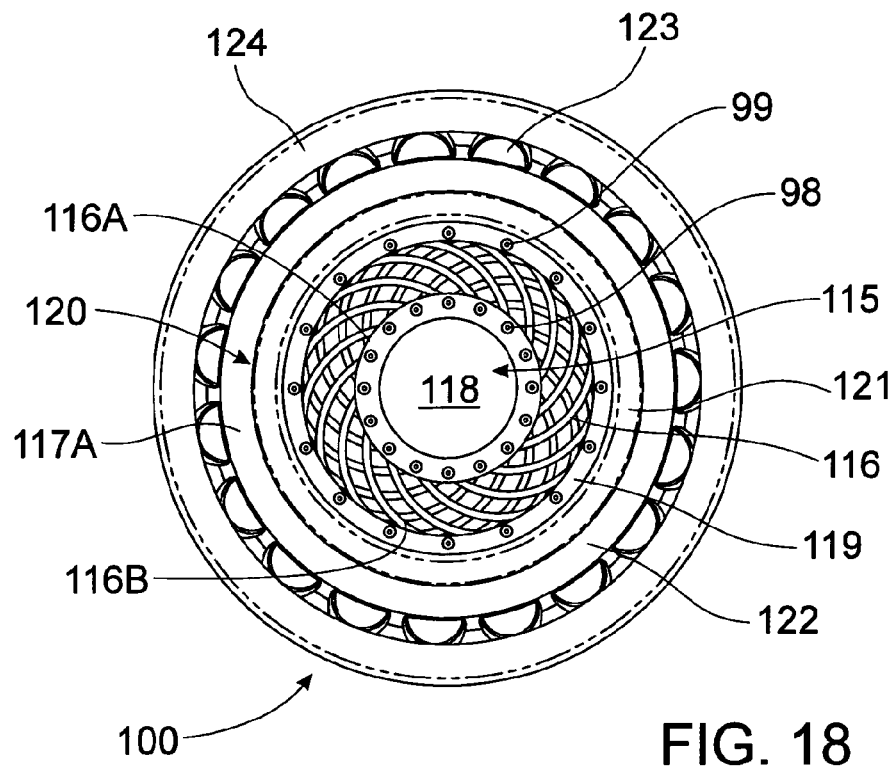
Figure 19:
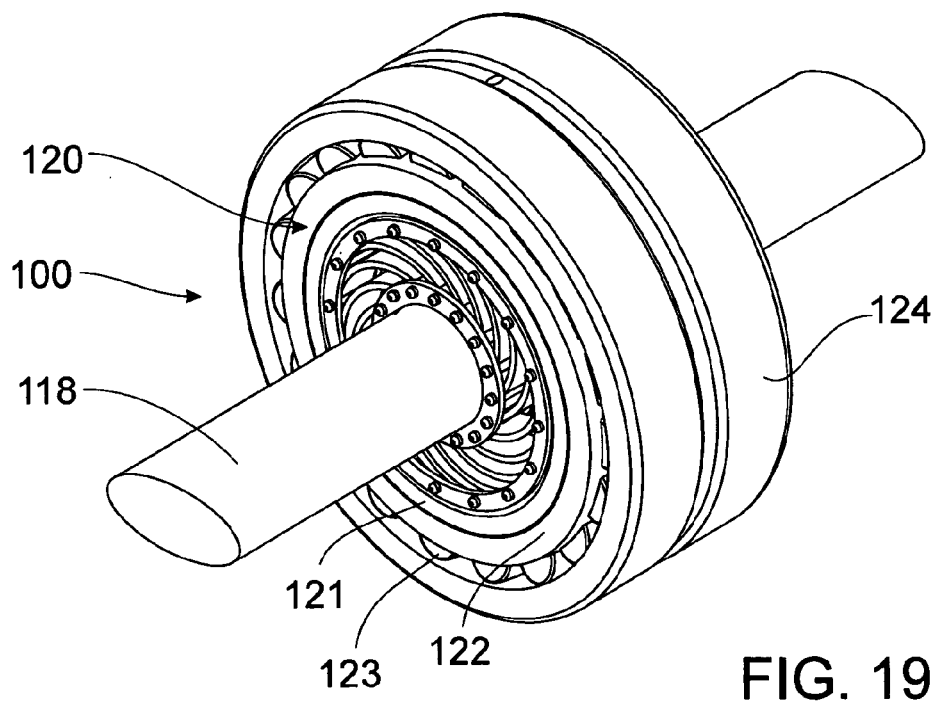

FIGS. 18-19 refers to an alternative embodiment of the invention wherein the spring elements are mounted directly to the vehicle shaft.

Figure 20:
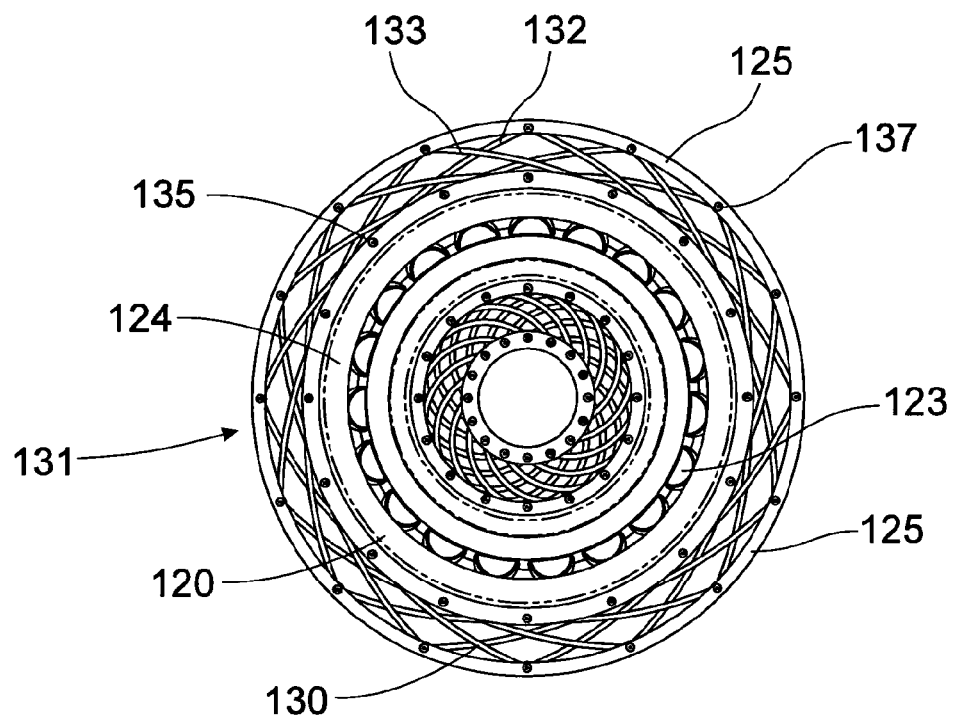
Figure 21:
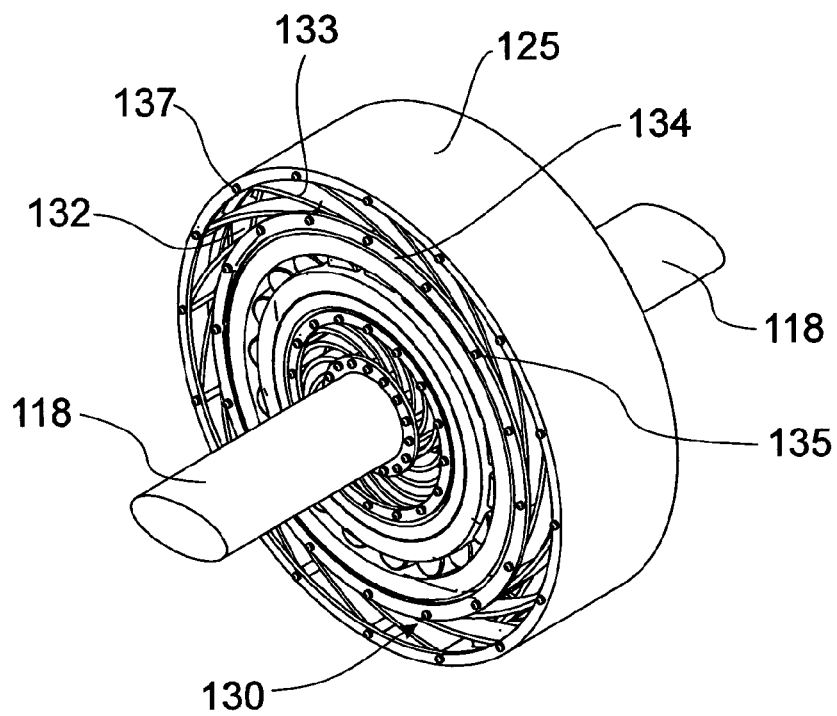

FIGS. 20-21 describe a similar embodiment to that shown in FIGS. 18-19 with the further inclusion of an outer spring assembly.

Figure 22:
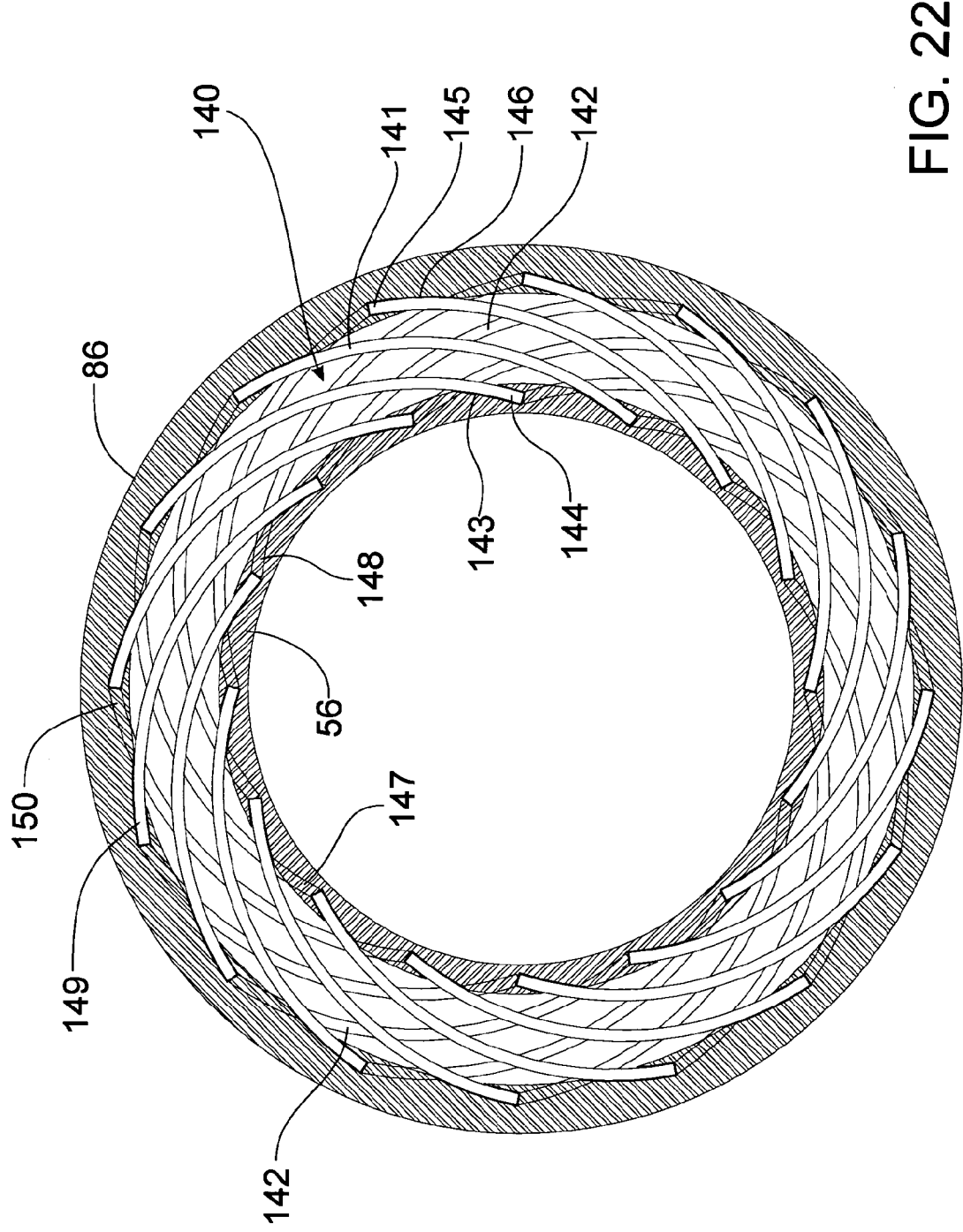

FIG. 22 describes an alternative arrangement of mounting each of the spring elements to the inner and outer carrier.

Figure 1:
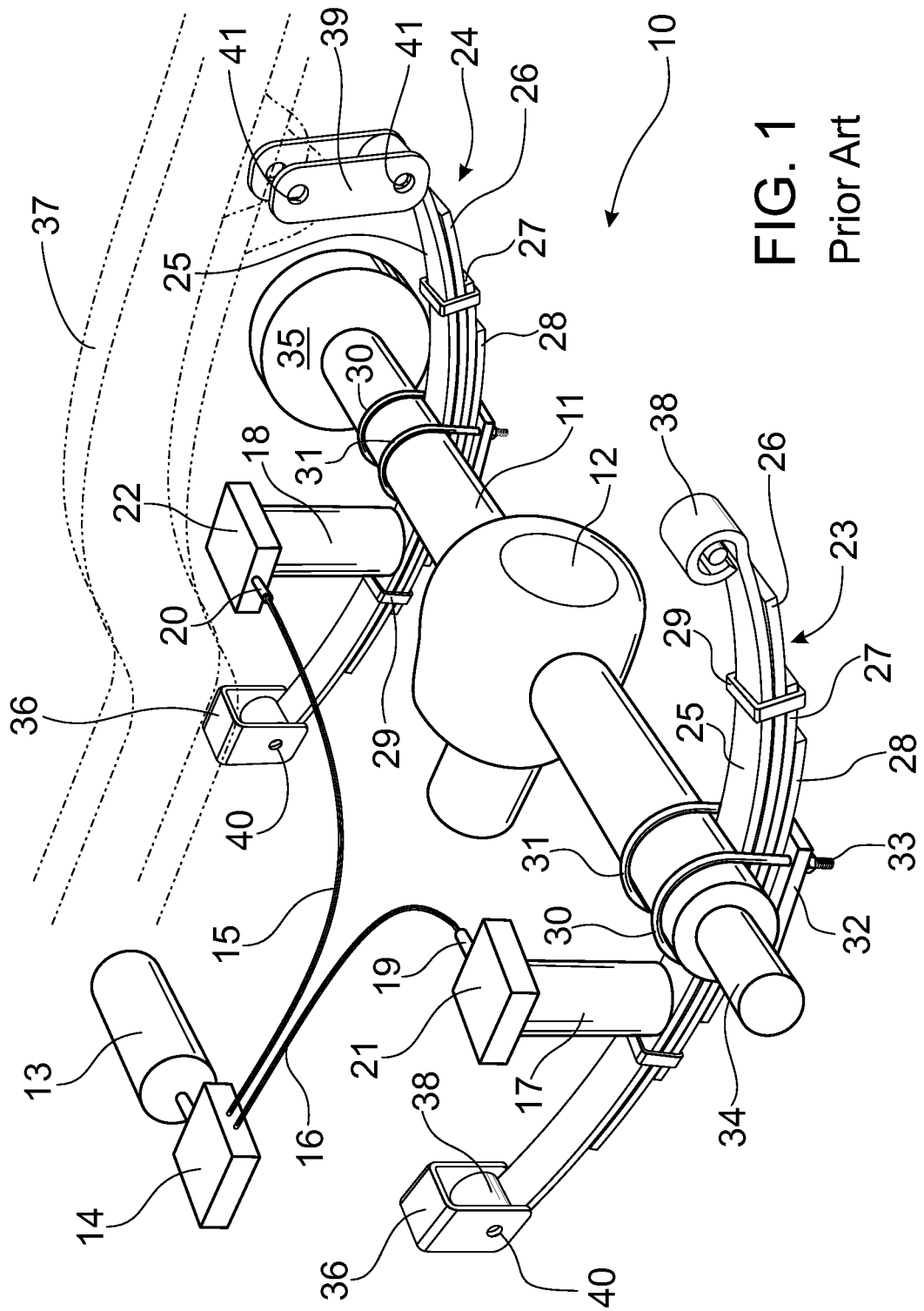
FIG. 1 is a perspective schematic view of a conventional leaf spring vehicle suspension assembly.

In FIG. 1 the conventional leaf spring suspension assembly 10 includes a wheel axle 11, differential 12, hydraulic or pneumatic motor 13, control box 14 and fluid conduits 15 or 16 for hydraulic fluid or air to travel into or be withdrawn from hydraulic cylinders or pneumatic cylinders 17 and 18 through inlets 19 and 20. Each of cylinders 17 and 18 have mounting blocks 21 and 22 for attachment to a vehicle chassis (not shown). For higher loads on the chassis fluid is caused to move into cylinders 17 and 18 and for lesser loads fluid is caused to be withdrawn from cylinders 17 and 18. There are also provided a pair of leaf spring assemblies 23 and 24 each having leaf springs 25, 26, 27 and 28 and having an arcuate shape as shown and secured together by clamps 29. Each leaf spring assembly 23 and 24 is attached by a pair of U bolts 30 and 31 on each side of suspension assembly 10 to wheel axle 11. Each U bolt 30 and 31 extends through mounting plate 32 and retained thereon by nuts 33. Wheel axle 11 has projections 34 for mounting of wheel hubs 35 in conventional manner. Each leaf spring assembly has attachment brackets 36 and associated attachment apertures 40 for attachment to an adjacent chassis member 37 shown in phantom. Each leave spring assembly 23 and 24 is provided with curled ends 38. These are also shown vertical brackets 39 for attachment of an adjacent curled end 38 to chassis member 37 by fasteners (not shown) extending attachment apertures 41.

Figure 2:
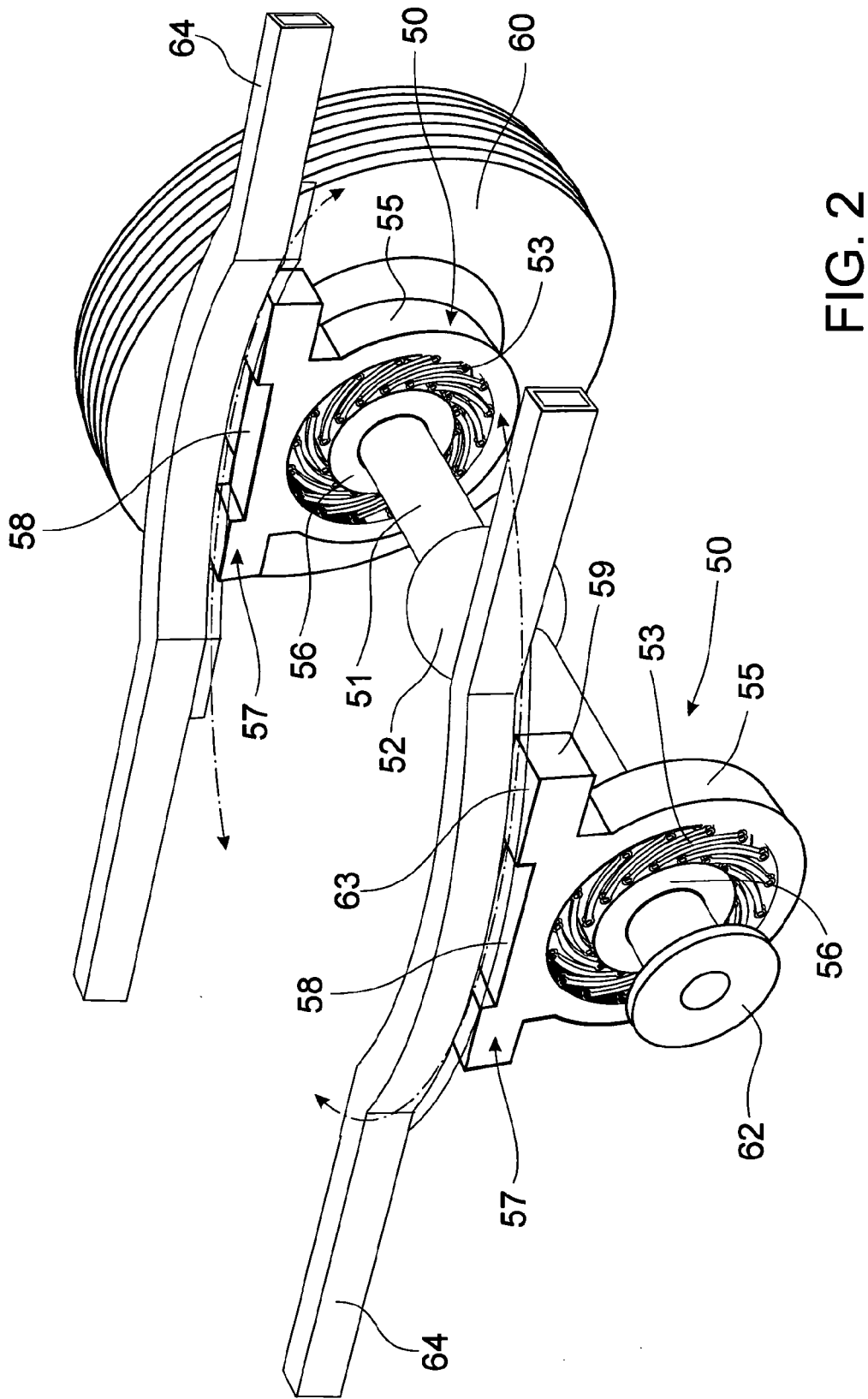
FIG. 2 is a perspective view of one embodiment of a vehicle suspension assembly of the invention.

In FIG. 2 there is shown a pair of wheel suspension assemblies 50 of the invention interconnected by a wheel axle housing 51. There is also shown differential 52 and a pair of spring assemblies 53 each having an outer rim housing or carrier 55 and inner carrier 56. Each inner carrier 56 is slidably attached or welded to wheel axle housing 51. Each outer housing or carrier 55 is provided with an upper extension 57 having a recess 58 for accommodation of a steering mechanism (not shown) whereby spring assemblies 53 may be used in connection with the steering assemblies for causing motion of each of wheels 60 in the direction shown in phantom. Wheels 60 may be attached to outer hub member 62. Each upper extension 57 is also provided with ends 59 having surfaces 63, wherein chassis members 64 are welded or otherwise attached to surface 63. However, it will be appreciated that recess 58 may be dispensed with as shown in embodiments hereinafter.

Figure 3:
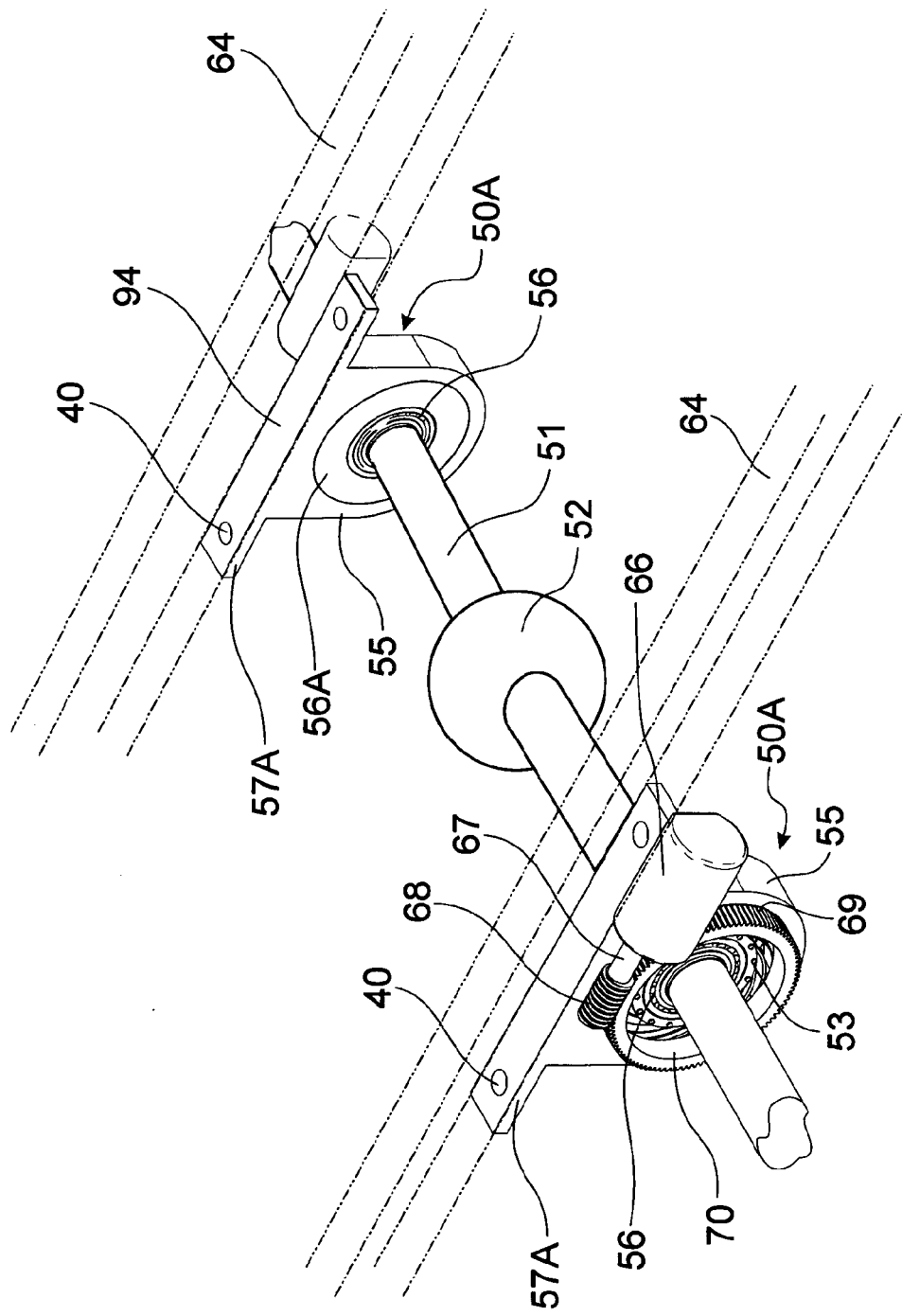
FIG. 3 is a perspective view of another embodiment of a vehicle suspension assembly of the invention.

In FIG. 3 reference may be made to another embodiment of the invention wherein each wheel suspension assembly 50A is adapted for attachment to frame members 64 of a vehicle chassis (not shown). There is also shown wheel axle 51 and differential 52. Each suspension assembly 50A includes spring assembly 53 mounted in outer housing or carrier 55 and inner carrier 56. Alternatively, spring assembly 56 may be located in an outer annular member 56A retainable in outer housing or carrier 55. Each outer housing 55 is provided with in an upper mounting extension 57A, having attachment apertures 40 for attachment to chassis frame members 64.

Each suspension assembly 50A also includes a drive motor 66 having a drive shaft 67 which has a worm gear at 68 for meshing with gear teeth 69 of a sprocket or pulley wheel 70 so as to actuate rotation of suspension assembly 50A for reasons as discussed in detail hereinafter.

Figure 4:
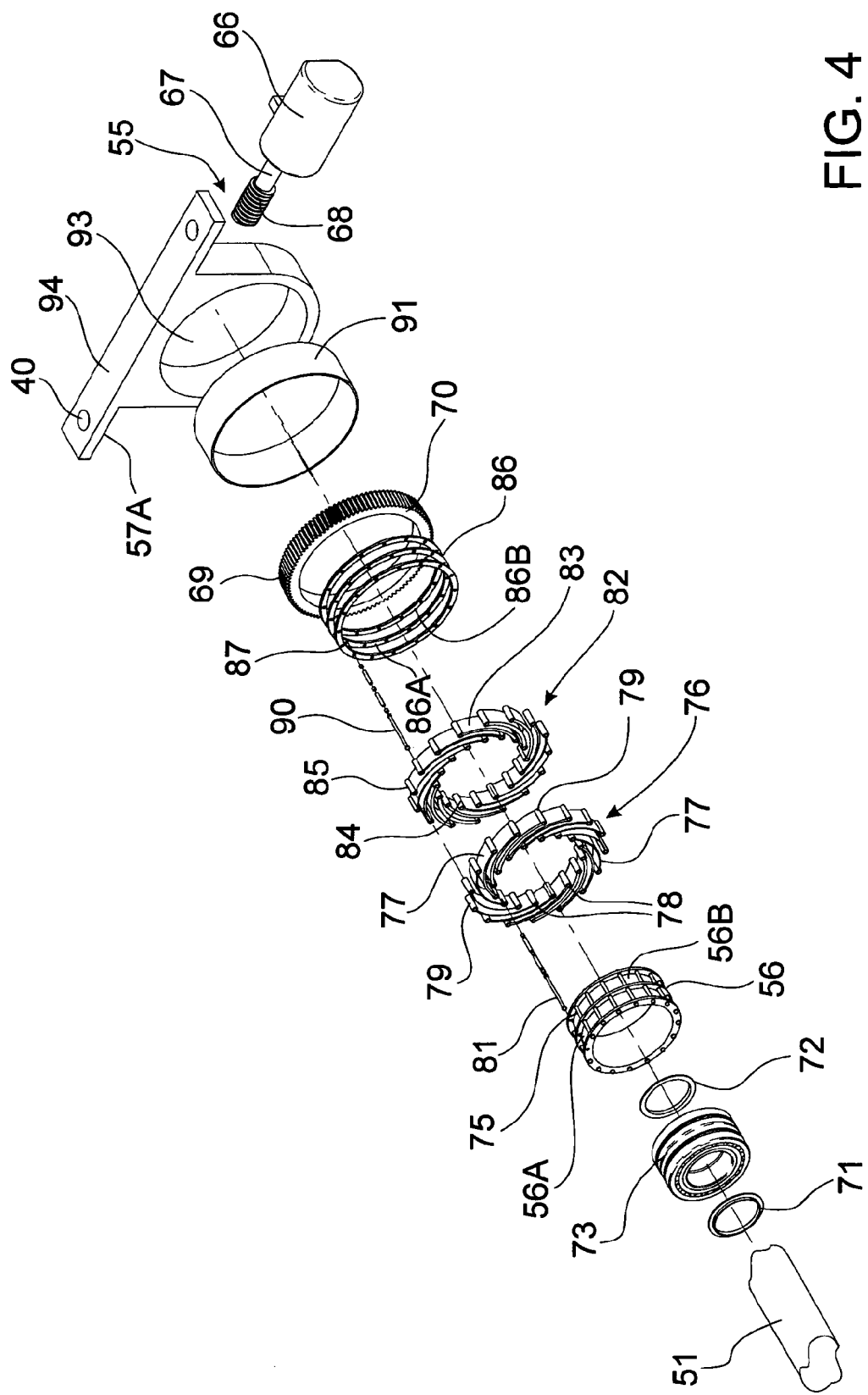
FIG. 4 is an exploded perspective view of the vehicle suspension assembly shown in FIG. 3.

In FIG. 4 there is shown a detailed exploded view of suspension assembly 50A, which includes wheel axle housing 51, sealing rings 71 and 72, inner bush or roller bearing 73, inner carrier member 56 having bush inserts 75, an array 76 of spring elements 77 having inner end sockets 78 and outer end sockets 79, an array 82 of spring elements 83 having inner sockets 84 and outer sockets 85, fasteners 81 which interconnect inner sockets 78 and inner sockets 84 to inner carrier member 56, fasteners 90 which interconnects outer sockets 79 and 85 to outer carrier member 86 which has attachment apertures 87, ring gear 70 having gear teeth 69, bush 91 and outer housing 55 having central aperture 93 for retention of bush 91. Upper extension 57A has mounting surface 94 for attachment to chassis member 64 shown in FIG. 3 by the use of fasteners (not shown) extending through attachment apertures 40.

It will also be appreciated that spring elements 77 may be located in outer race 56A of inner carrier 56 and spring elements 83 may be located in outer race 56B. In similar fashion spring elements 77 may be located in inner race 86A of outer carrier 86 and spring elements 83 may be located in outer race 86B of outer carrier 86.

Figure 5:
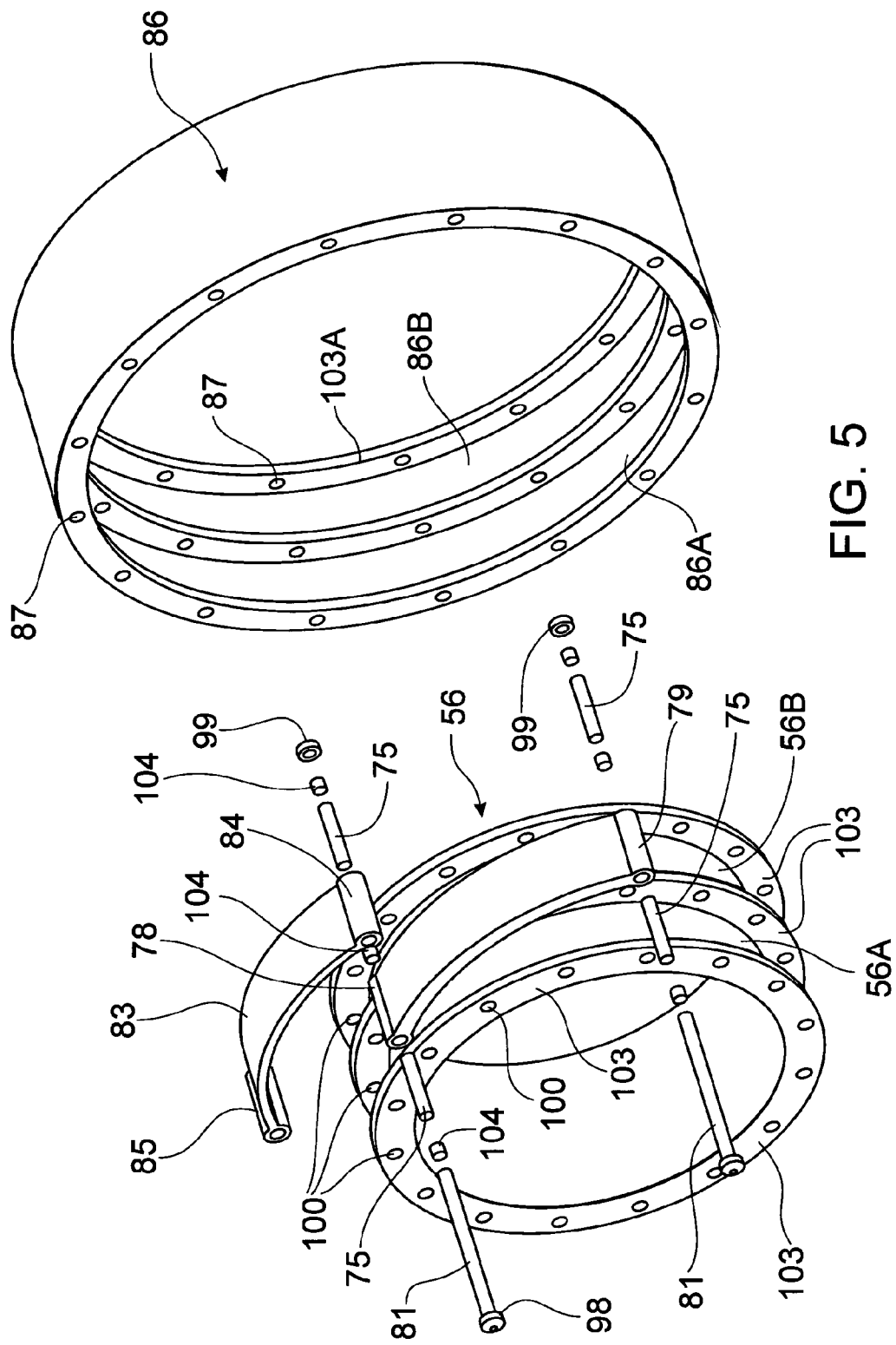
FIG. 5 is a perspective view of the interconnection of inner ends of spring elements to an adjacent solid annular member or carrier member.
Figure 6:
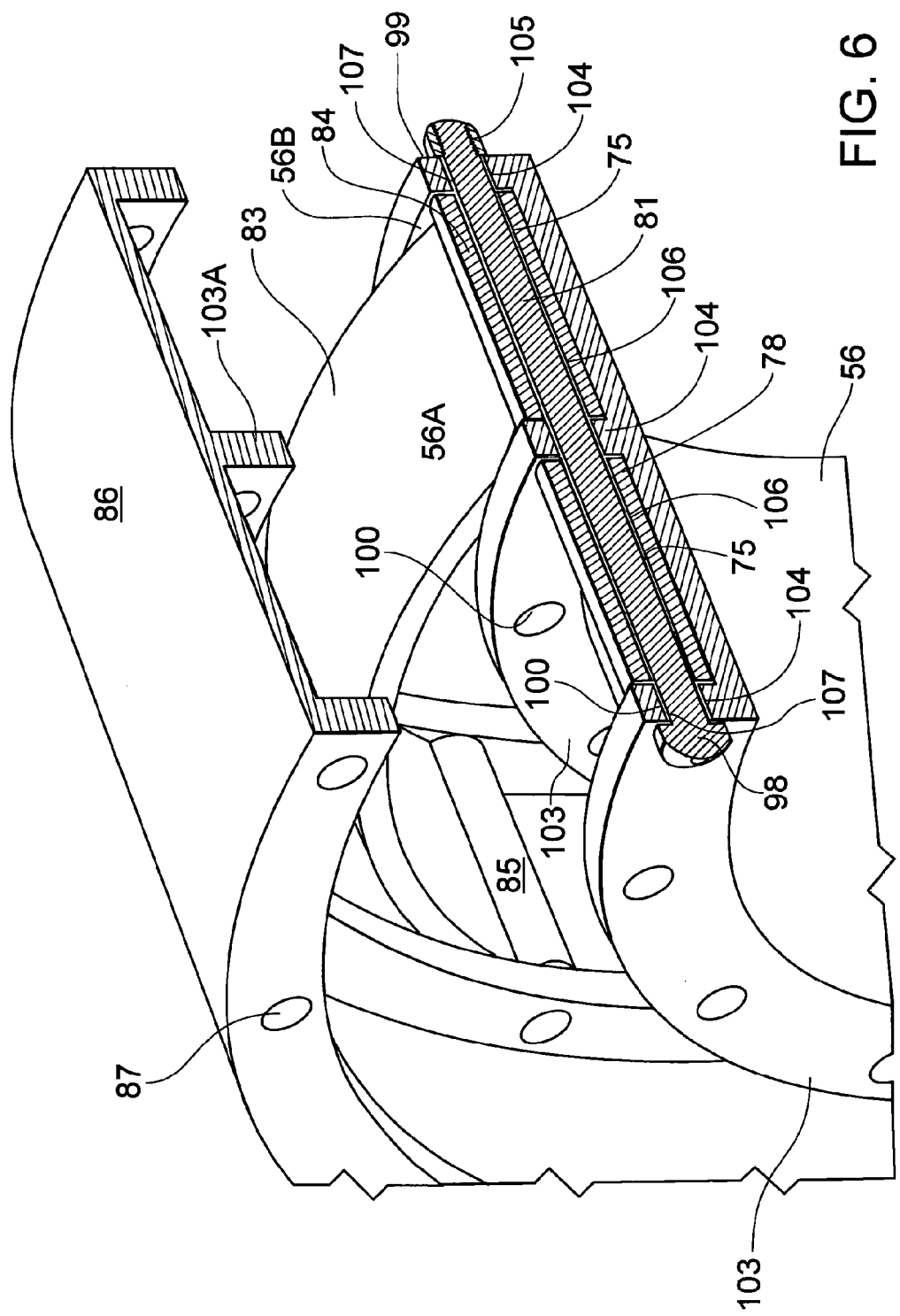
FIG. 6 is a more detailed view of the arrangement shown in FIG. 5.

FIGS. 5-6 show how array 76 of spring elements 77 and array 82 of spring elements 83 are accommodated or retained in races 56A and 56B of inner carrier 56. Thus elongate pins 81 having integral heads 98 and retaining nuts 99 are inserted through a row of aligned attachment apertures 100 in each flange 103 of inner carrier 56 with each insert or bush 75 being inserted in inner end sockets 78 and 84 as shown and each of the shorter length inserts or bushes 104 being inserted in apertures 100 as shown in FIG. 6. Thus each of inner end sockets 78 and 84 are located in races 56A and 56B, respectively between adjacent flanges 103 and are retained in desired position by insertion of pins 81 through short insert 104, longer inserts 75 and attachment to nuts 99. FIG. 6 shows inserts 104 retained in internal passage 107 of apertures 100 and inserts 75 retained in internal passages 106 of inserts 75.

It will be appreciated that each of outer end sockets 79 and 85 of spring elements 77 and 83 may be retained in internal races 86A and 86B of outer carrier 86 by elongate fasteners 90 which are similar to fasteners 81 in similar manner.

Figure 7:
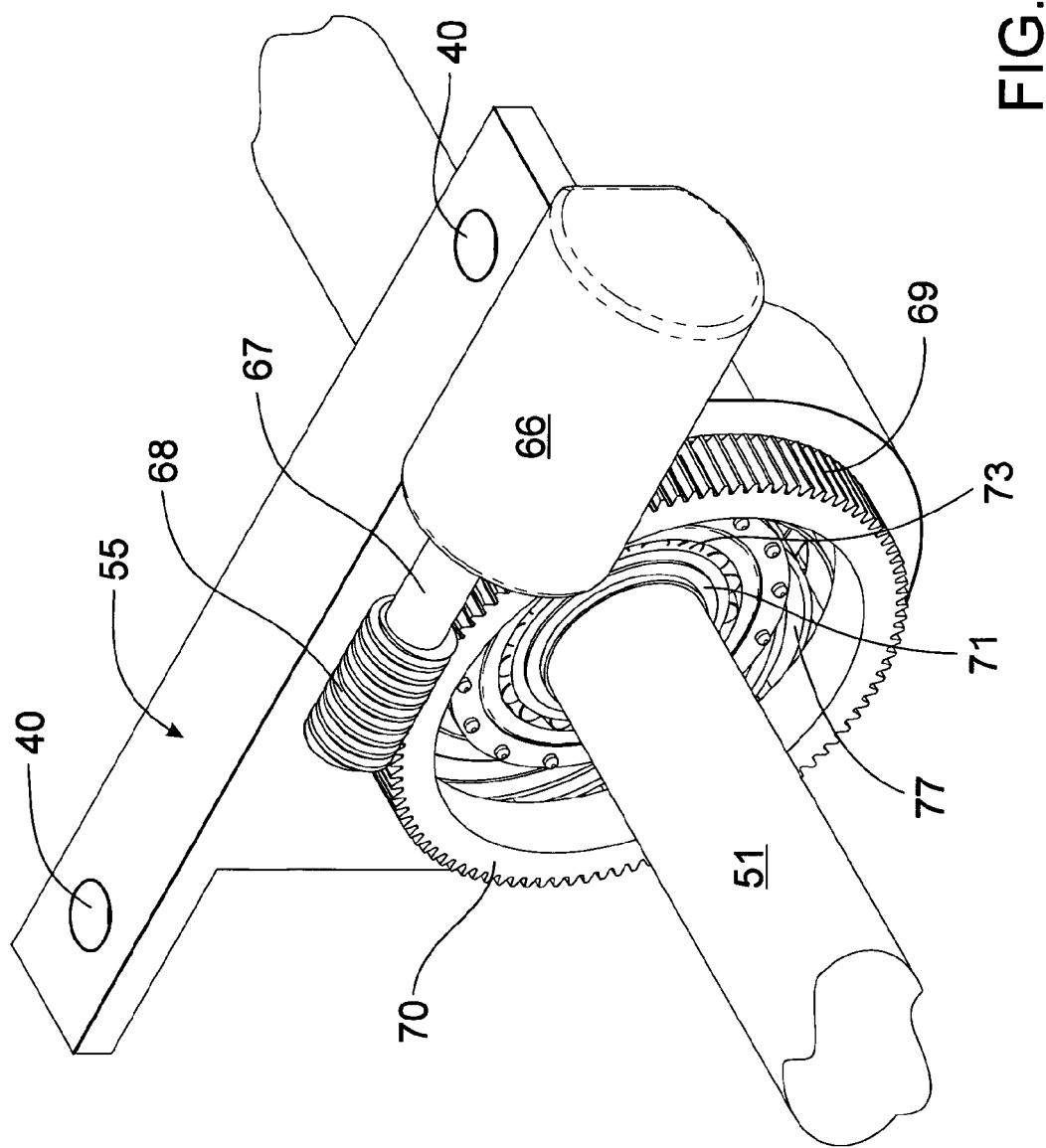
FIG. 7 is a perspective view of a suitable means for causing rotation of each array of opposing springs and associated carrier members relative to a vehicle chassis.
Figure 8:
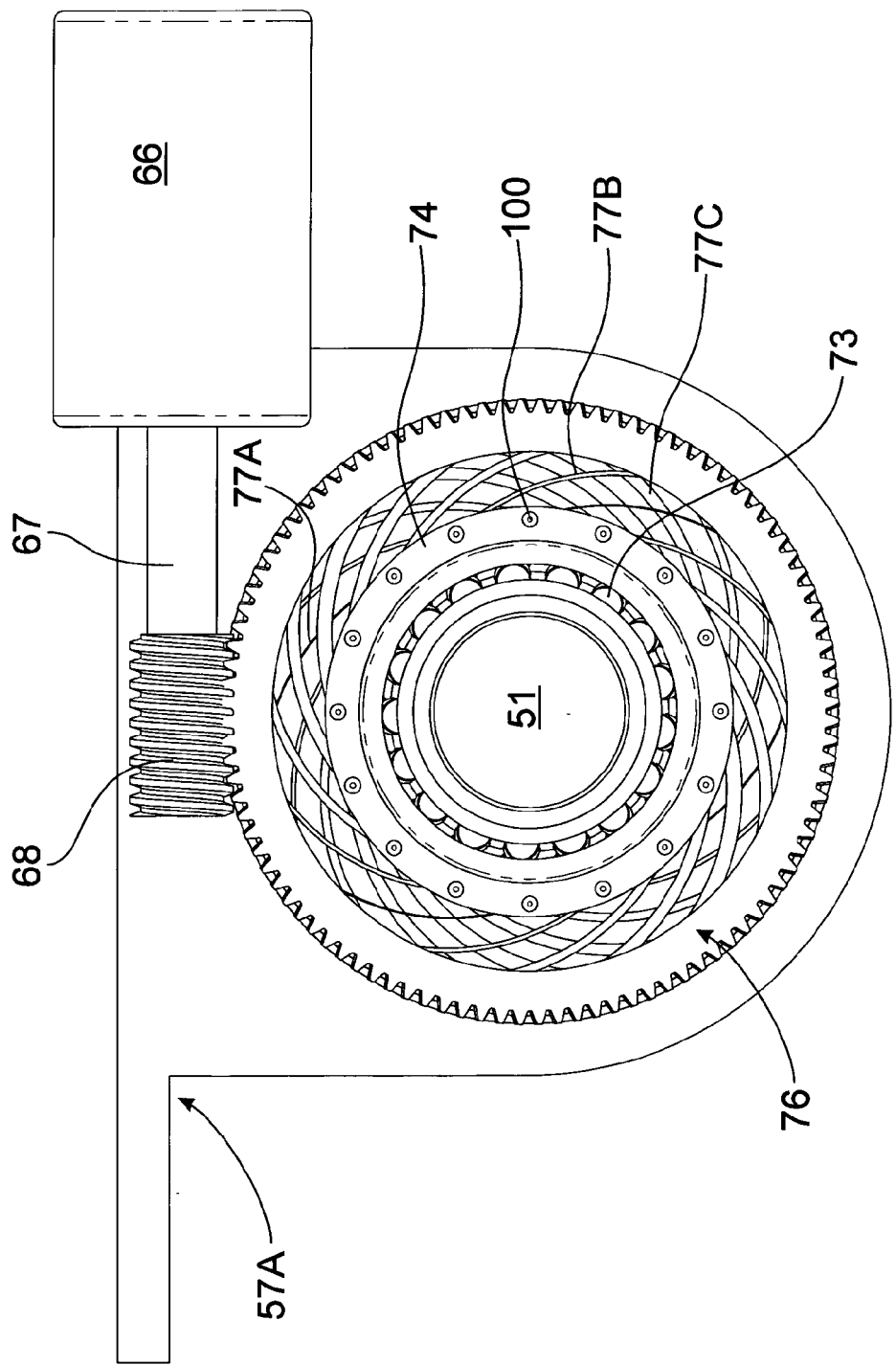
FIG. 8 is a front view of the arrangement shown in FIG. 5.

FIGS. 7-8 are assembled view of the components shown in FIG. 4 and also show a detailed view of outer housing 55 and ring gear 70 showing the interconnection between worm gear 68 and gear teeth 69, which results in rotation of spring arrays 76 and 82 and corresponding solid carriers 56 and 86 relative to fixed outer housing 55.

FIG. 8 shows another embodiment of the invention where springs in spring array 76 have different thicknesses as shown by relatively thin springs 77A, springs 77B of intermediate thickness and springs 77C of greater thickness. The relevance of this is discussed hereinafter.

Figure 9:
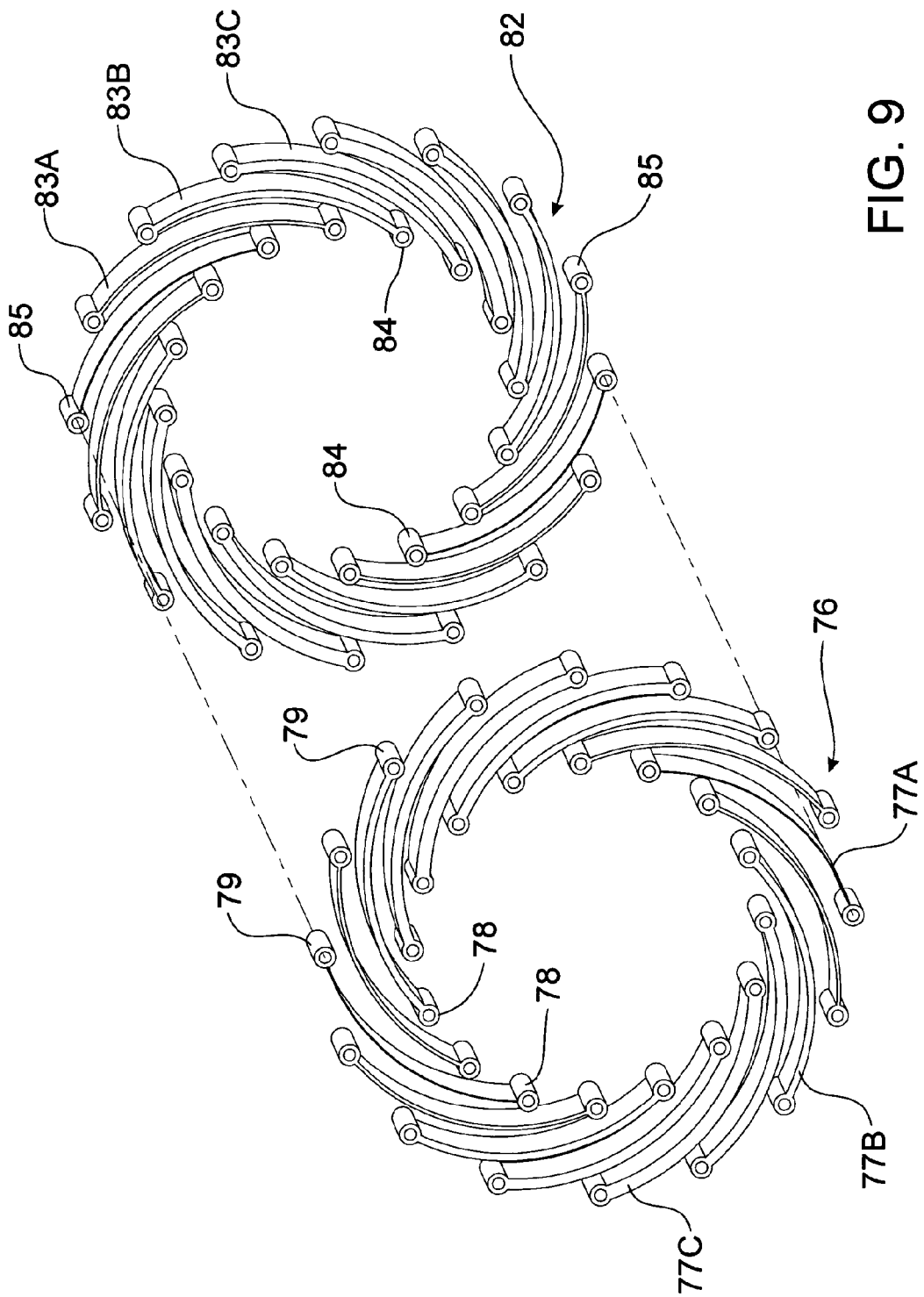
FIG. 9 is a perspective view of a pair of arrays of sprung elements having different thicknesses.

FIG. 9 shows how the spring arrays 76 and 82 are oriented with springs 77A, 77B and 77C shown each having a different thickness as described in FIG. 8. It will be noted that spring array 82 also has springs 83A, 83B and 83C also of different thickness and that such springs are oriented in an opposing or counteracting orientation to springs 77A, 77B and 77C.

In another embodiment shown in FIG. 10 there is shown two arrays 76A and 76B of springs 77 all of equal thickness and varying widths and two arrays 82A and 82B of springs 83 all of equal thickness and varying widths. Thus, the invention contemplates multiple arrays of springs in pairs providing each array in a particular pair are of opposing or counteracting orientation.

FIG. 11 shows the arrangement of springs in opposing relationship as shown by the arrows in opposing relationship.

Figure 12:
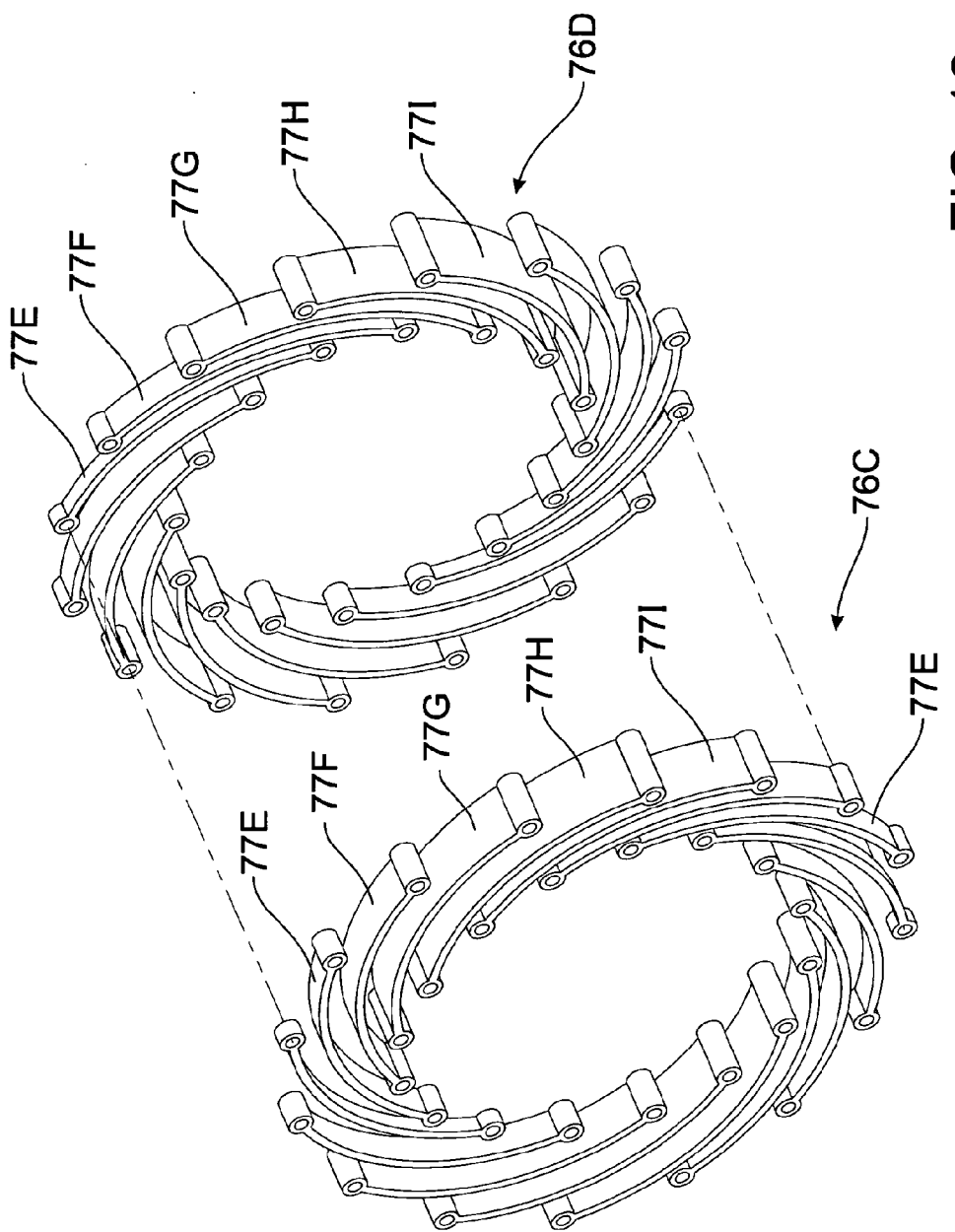
FIG. 12 is a perspective view of spring elements of one array showing a range of increasing widths.

FIG. 12 shows spring arrays 76C and 76D in opposing relationship each having springs 77E, 77F, 77G, 77H and 77I all having different widths. This is a variation to what is shown in FIG. 9.

Figure 14:
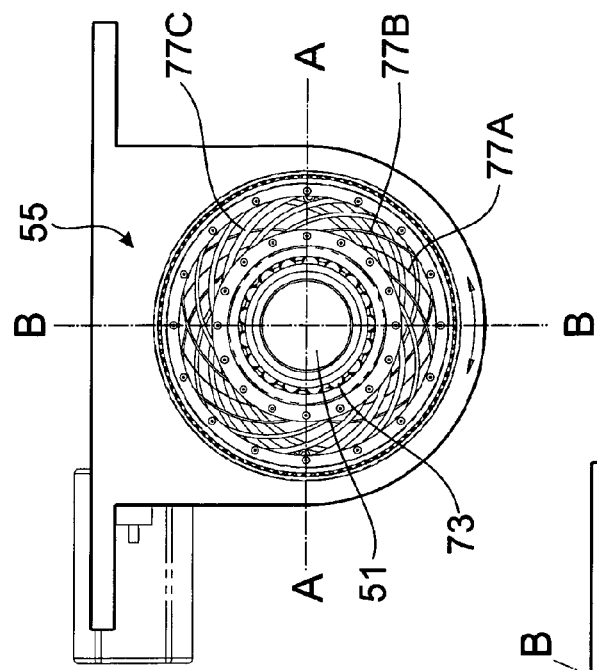
FIGS. 13, 14 and 15 show rotation of the double array of springs and associated carrier bodies whereby a weak axis and strong axis is shown in a horizontal orientation in FIGS. 13 and 14 and a weak axis is shown in an oblique orientation which corresponds to a near vertical orientation in FIG. 15.
Figure 15:
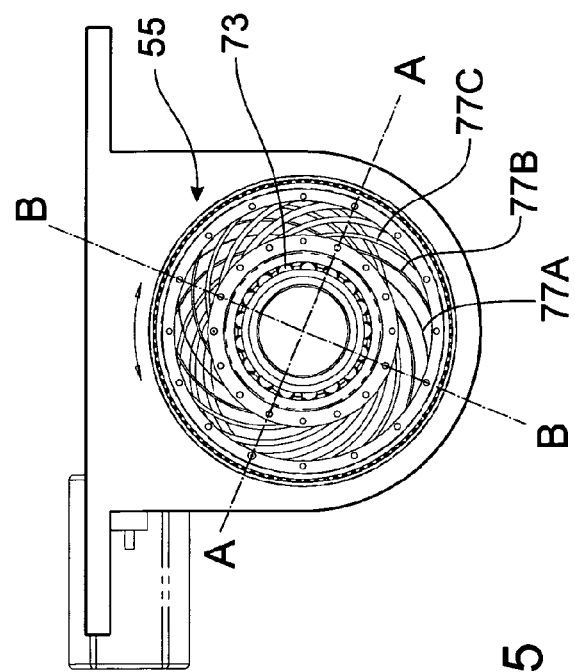
Figure 13:
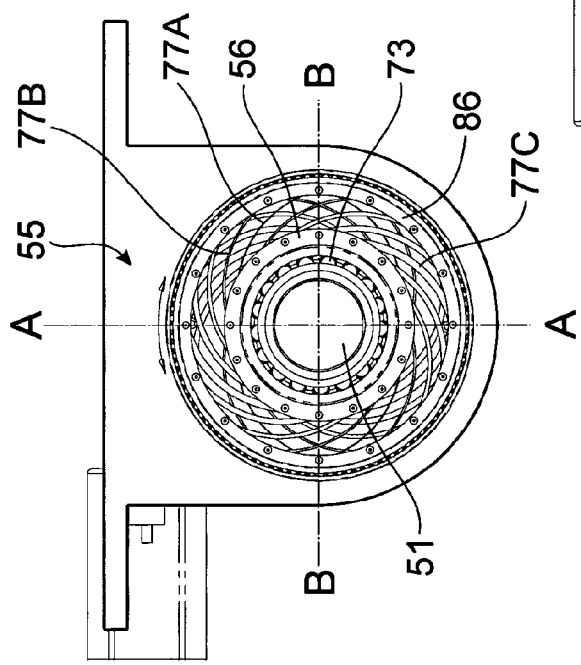

FIGS. 13-15 show that providing springs 77 of different widths or thicknesses or made from different materials means that rotation of spring elements 77A, 77B and 77C provides a weak axis defined by axis "B-B" in a horizontal plane or a strong axis defined by axis "A-A" in a vertical plane. Rotation of spring elements 77A, 77B and 77C through 90° shows that the reverse is obtained in FIG. 14 and this means that when it is desired to provide a vehicle with a strong load bearing capacity the arrangement shown in FIG. 13 is to be preferred. However, a more reduced load bearing capacity can be imparted to the vehicle by rotation of spring elements 77A, 77B and 77C to what is shown in FIG. 14. An intermediate load bearing capacity can be obtained in FIG. 15, which shows a rotation of 22½° to what is shown in FIG. 14. There is also shown vehicle shaft 51A.

Figure 16:
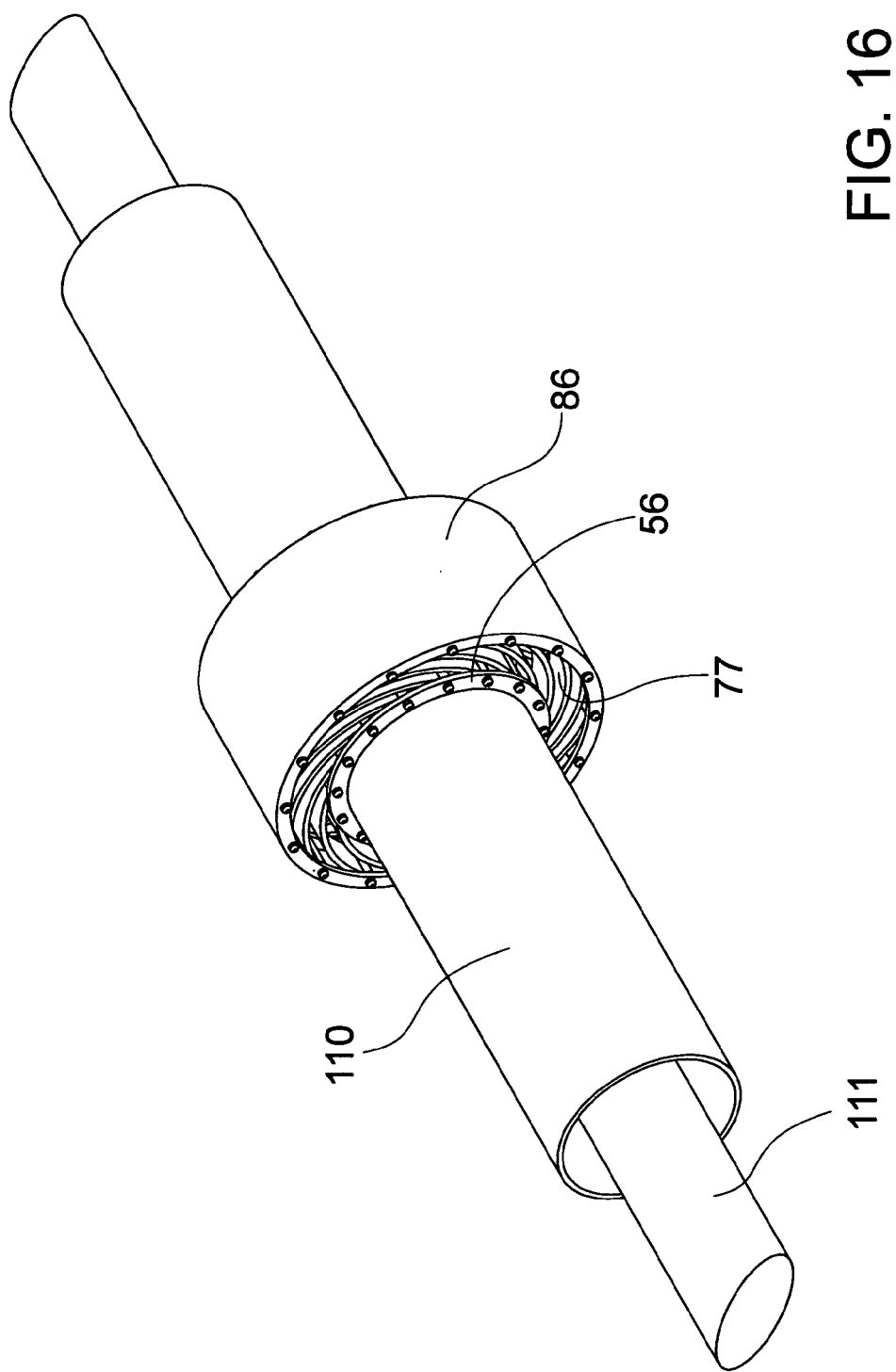
FIG. 16 shows a perspective view of another embodiment of the invention where the spring suspension assembly shown in FIG. 3 is used with a support housing which houses a movable shaft or axle.

FIG. 16 shows another embodiment of the invention wherein spring arrays 76 and 82 and their associated solid carriers 56 and 86 may be provided with a hollow casing 110 in order to protect shafts 111 that are movable either longitudinally or rotationally. In this embodiment shaft 111 is capable of either of these movements.

Figure 17:
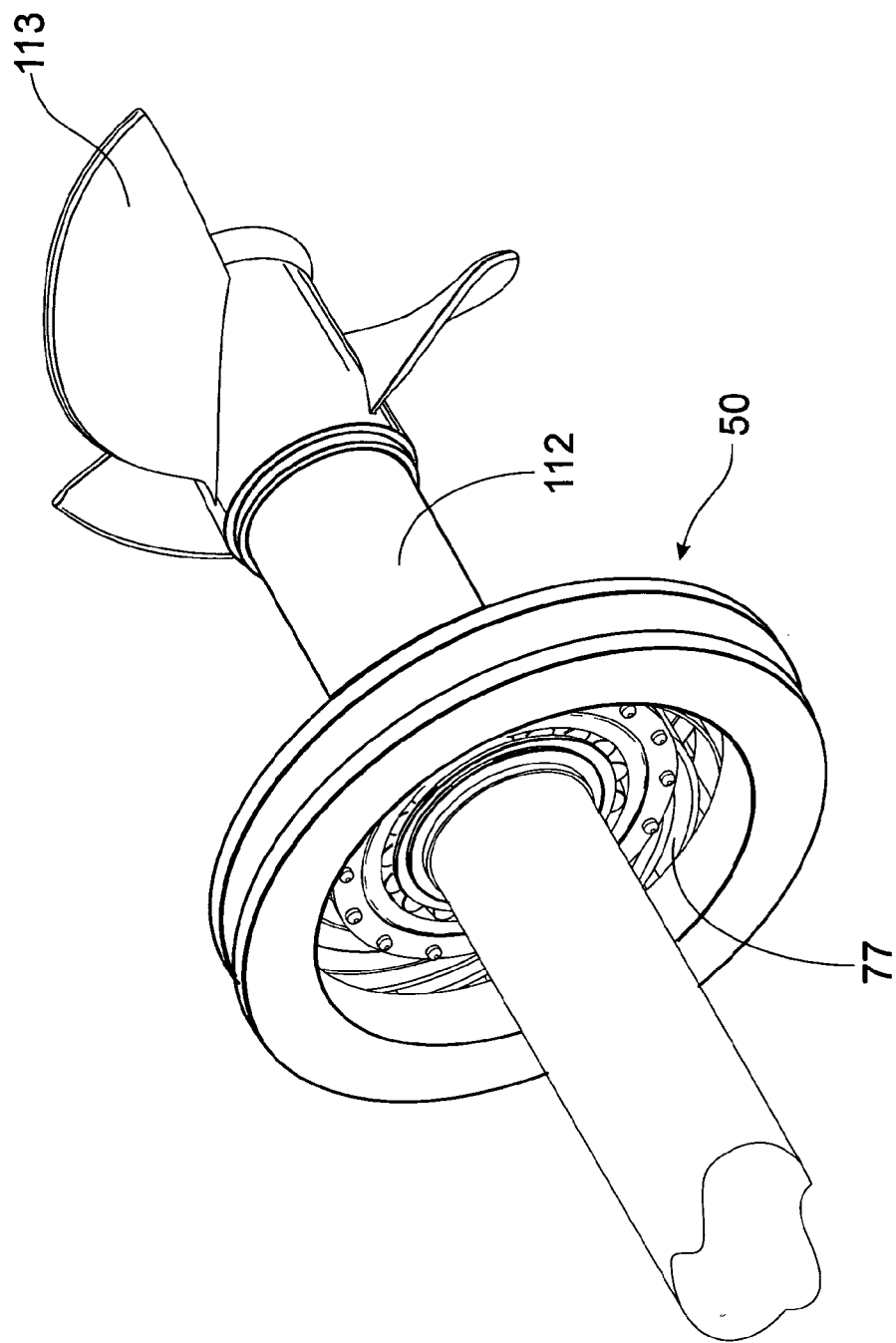
FIG. 17 shows the spring suspension assembly used in FIG. 3 when used for supporting a propeller shaft.

FIG. 17 shows another embodiment of the invention wherein spring suspension assembly 50 may be used to support a propeller shaft 112 having propeller blades 113.

FIGS. 18-19 show another variation in the invention in relation to suspension assembly 100, wherein spring assembly 115 comprising spring elements 116 and 117 in different opposing arrays may have their inner ends 116A fixed to mounting flange 117 of shaft 118 by fasteners 98 and their outer ends 116B attached to flange 119 of outer carrier 120 by fasteners 99. The outer carrier 120 comprises a bush 121 and an inner bearing housing 122 an outer bearing housing 124. There is also provided a bearing race 123. Thus outer carrier 120 may be fixed to an outer housing 55 as shown in FIGS. 1 & 2. Thus outer carrier 120 and spring assembly 115 rotate in unison with shaft 118. This arrangement would be extremely useful as a combined suspension and shock absorber and may allow for conventional shock absorbers to be minimized or dispensed with.

In an alternative arrangement as shown in FIGS. 20-21, there is further provided an outer spring assembly 130 interposed between outer carrier 120 and an external casing 125 and this resulting assembly 131 can be used for absorbing larger shocks such as a vehicle hitting a deep pothole in a road. Spring assembly 130 may comprise spring elements 132 and 133 in opposing orientations. Each of the springs 132 and 133 may have their inner ends attached to flange 134 by fasteners 135 and their outer ends attached to outer casing 125 by fasteners 137.

In another variation spring assembly 130 may be rotated by a gear assembly as shown in FIG. 7 relative to an external housing (not shown in FIGS. 20-21 but corresponding to housing 55 shown in FIG. 7) so that spring assembly may rotate through a selected angular displacement such as that shown in FIGS. 13, 14 and 15 so that a vehicle may be converted from a loading position to an unloading position. The gear assembly may be actuated by any suitable actuator such as a hydraulic or pneumatic ram assembly or by a pulley and cable arrangement. The rotation of spring assembly 130 may be retained in a fixed position during travel. In one arrangement outer casing 125 may correspond to ring gear 69 shown in FIG. 7.

In yet another arrangement shown in FIG. 22, there is shown another method of mounting a spring assembly 140 comprising arrays of spring elements 141 and spring elements 142 in counteracting orientations as shown in FIG. 22, wherein inner ends 144 of springs 141 are mounted in slots or keyways 143 in inner carrier 56 and outer ends 145 of springs 141 are mounted in slots or keyways 146 located in outer carrier 86. In a similar manner, inner ends 147 of springs 142 may be mounted in slots or keyways 148 of inner carrier 56 and outer ends 149 of springs 142 may be mounted in slots or keyways 150 of outer carrier 86. This is an arrangement which is far simpler structurally than using pins 81 and 90 shown in FIGS. 5-6.

It therefore will be appreciated from the foregoing that the spring suspension assembly of the invention in using opposing arrays of spring elements is a very simple construction and is very effective in use. There are also multiple applications as shown in FIGS. 8, 9, 10, 11 and 12, FIGS. 13-15; FIGS. 18-19, 20-21 and FIG. 22.

It will also be appreciated that as shown in FIGS. 2 and 3 and FIG. 16, that the term "vehicle axle or shaft" as used herein may also include within its scope a vehicle axle or shaft housing as shown in FIGS. 2-3 which has a hollow interior and thereby includes a rotatable axle or shaft and a surrounding bearing.

The invention claimed is:

1. A spring suspension assembly for a vehicle which has a plurality of spring elements which are attached to an inner carrier and an outer carrier respectively wherein respective arrays of the spring elements are oriented in opposing or counteracting orientation and each spring element has a shape substantially corresponding to an arc of a circle characterised in that said outer carrier includes a housing adapted to be non-rotatably mounted to a vehicle chassis and said inner carrier is mountable to a vehicle axle or shaft such that the arrays of spring elements can be rotated relative to the housing.

2. A spring suspension assembly as claimed in claim 1, wherein the inner carrier includes a mounting flange attachable or weldable to the vehicle shaft or integral therewith.

3. A spring suspension assembly as claimed in claim 2, wherein the outer carrier has a plurality of attachment apertures for attachment of adjacent outer ends of each array of spring elements so that each array of spring elements rotates in unison with rotation of the vehicle shaft in use.

4. A spring suspension assembly as claimed in claim 3 further incorporating an outer spring assembly incorporating respective arrays of spring elements which are oriented in opposing or counteracting orientations wherein each spring element has a shape substantially corresponding to an arc of a circle.

5. A spring suspension assembly as claimed in claim 4, wherein the outer spring assembly is moveable relative to the outer carrier.

6. A spring suspension assembly as claimed in claim 1, wherein the inner carrier is an annular member which has a diameter or transverse dimension appropriate for location on the vehicle axle or shaft or a housing surrounding the axle or shaft.

7. A spring suspension assembly as claimed in claim 6, also incorporating an annular bush or bearing located adjacent to the inner carrier.

8. A spring suspension assembly as claimed in claim 1, wherein the housing includes an aperture for retention of respective arrays of spring elements.

9. A spring suspension assembly as claimed in claim 8, wherein the housing further includes a bush or bearing.

10. A spring suspension assembly as claimed in claim 8, wherein the housing includes a bearing or bush for rotation of each of the arrays of spring elements when required.

11. A spring suspension assembly as claimed in claim 8, wherein the housing has a flattened surface to facilitate attachment to a corresponding surface of the vehicle chassis.

12. A spring suspension assembly as claimed in claim 1, wherein the outer carrier includes an annular member which is mountable to the housing.

13. A spring suspension assembly as claimed in claim 1, wherein both the inner carrier and the outer carrier incorporate attachment members inclusive of apertures, sockets, or pins for use with fasteners in (i) attachment of respective outer ends of the spring elements to the outer carrier and (ii) attachment of respective inner ends of the spring elements to the inner carrier.

14. A spring suspension assembly as claimed in claim 1, wherein the inner carrier incorporates a plurality of races each for retention of an adjacent array of spring elements.

15. A spring suspension assembly as claimed in claim 1, wherein the outer carrier incorporates a plurality of races each for retention of an adjacent array of spring elements.

16. A spring suspension assembly as claimed in claim 1, wherein each array of spring elements is oriented in a different plane.

17. A spring suspension assembly as claimed in claim 1, wherein spring elements of each array have different widths, have different thicknesses or are formed of different materials so that when rotation of each array occurs, the suspension assembly has a different load bearing capacity after rotation than before rotation.

18. A spring suspension assembly as claimed in claim 1, wherein each of the arrays of spring elements are rotated when actuated by an actuator.

19. A spring suspension assembly as claimed in claim 18, wherein the outer carrier has a ring gear and the actuator includes a worm gear that initiates movement of the ring gear.

20. A spring suspension assembly as claimed in claim 19, wherein the worm gear is attached to a drive shaft or drive motor.

21. A spring suspension assembly as claimed in claim 1, wherein each array of spring elements has respective inner ends and outer ends attachable to corresponding keyways or slots located in the inner carrier and outer carrier, respectively.

22. A spring suspension assembly as claimed in claim 1, wherein rotation of the spring elements causes the spring suspension assembly to have a different load bearing capacity after rotation than before rotation.

* * * * *